H. A. SEARS.

BEDSTEAD.

Reissued Mar. 1, 1910. APPLICATION FILED JULY 23, 1908.

13,087.

2 SHEETS—SHEET 1.

WITNESSES

J. P. Davis

INVENTOR

Homer A. Sears

BY

Munn & Co.

ATTORNEYS

H. A. SEARS.
BEDSTEAD.
APPLICATION FILED JULY 23, 1909.
Reissued Mar. 1, 1910.
13,087.
2 SHEETS—SHEET 2.
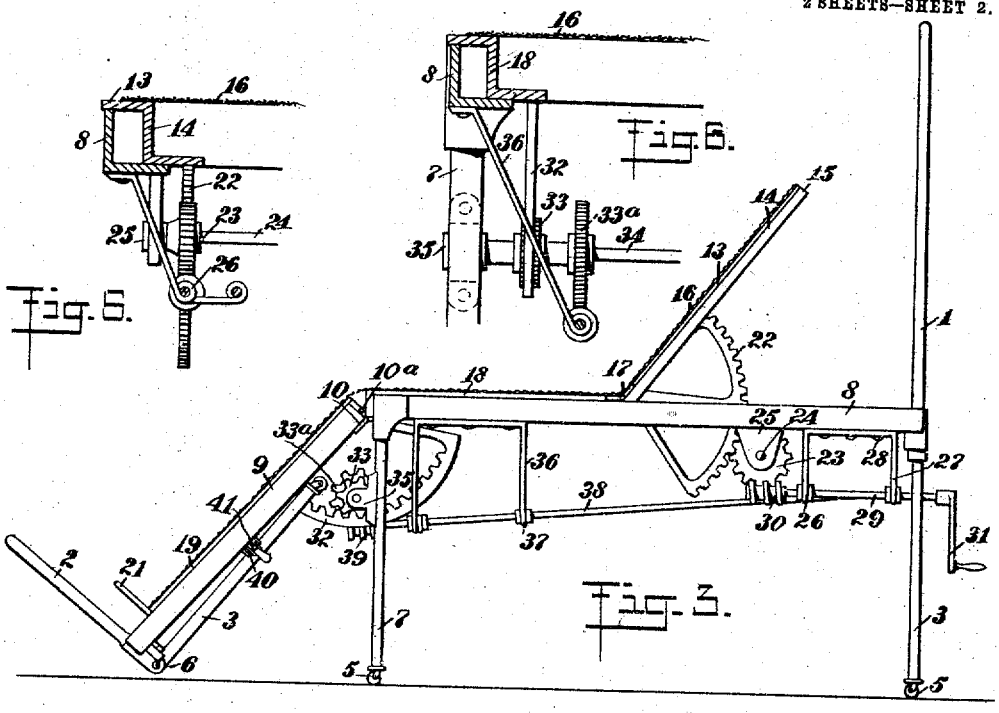
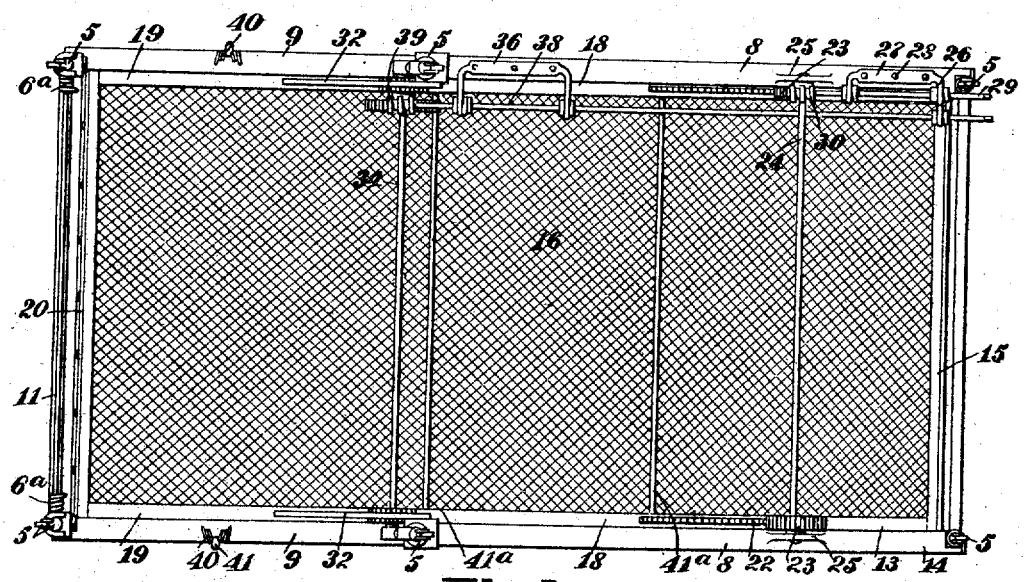
WITNESSES
J. P. Davis
INVENTOR
Homer A. Sears
BY
Munn & Co.
ATTORNEYS

UNITED STATES PATENT OFFICE.

HOMER A. SEARS, OF PORTLAND, OREGON.

BEDSTEAD.

13,087. Specification of Reissued Letters Patent. Reissued Mar. 1, 1910.

Original No. 912,036, dated February 9, 1909, Serial No. 449,426. Application for reissue filed July 23, 1909. Serial No. 509,402.

*To all whom it may concern:*

Be it known that I, HOMER A. SEARS, a citizen of the United States, and a resident of Portland, in the county of Multnomah and State of Oregon, have invented a new and Improved Bedstead, of which the following is a full, clear, and exact description.

This invention relates to bedsteads, and more particularly such as are adapted to be used by invalids, and which are so constructed that they can be adjusted to form reclining chairs, or to present back rests, without the necessity of disturbing the patients or removing them from the beds.

The object of the invention is to provide a device of the class described, which is constructed in sections, the foot section being adapted to be lowered so as to constitute the foot rest of a chair, and a head portion being adapted to be raised so as to form a back rest, manually operable means being provided for moving these sections into the desired positions.

Reference is to be had to the accompanying drawings forming a part of this specification, in which similar characters of reference indicate corresponding parts in all the views.

Figure 1:
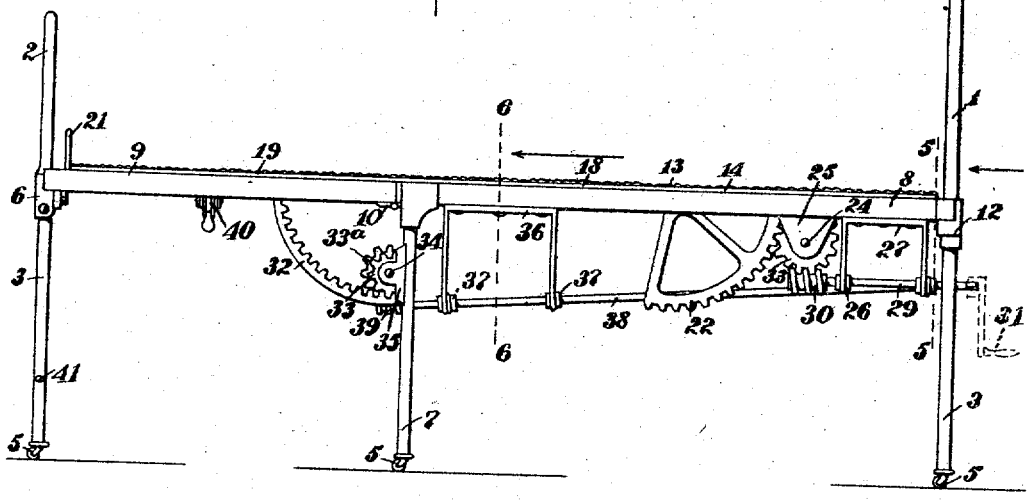
Figure 2:
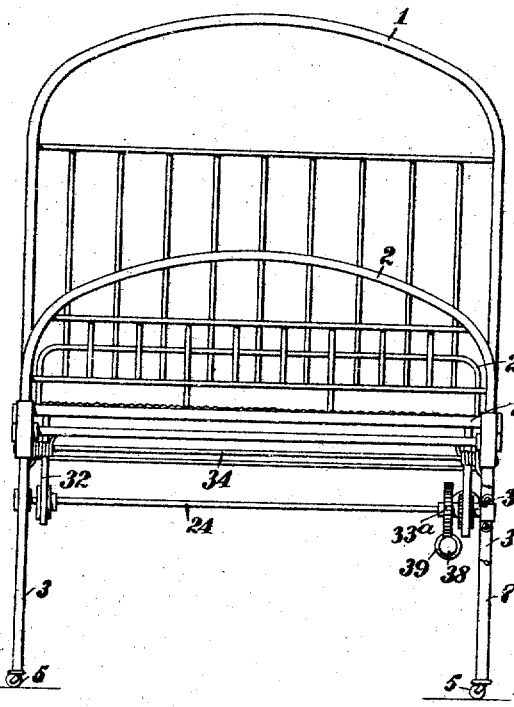

Figure 1 is a side elevation of an embodiment of my invention, showing the same in the extended form in which it constitutes a bed; Fig. 2 is an end elevation of the device; Fig. 3 is a side view of my invention, showing the same in the form of a chair; Fig. 4 is an inverted plan view; Fig. 5 is an enlarged cross section on the line 5—5 of Fig. 1; and Fig. 6 is an enlarged cross section on the line 6—6 of Fig. 1.

In the specific form shown in the drawings, I provide a bedstead having a back 1 and a foot 2 of any preferred form, the ends of which form the legs 3 of the bed, and are adapted to be supported on casters 5. The legs 3 of the foot 2 are secured to the latter by means of hinges 6 so that they can be folded up when desired. Between the back and foot of the bed are intermediate legs 7. Connecting the legs 7 and the back 1 are permanent rails 8, preferably in the form of angle irons, as shown most clearly in Fig. 5. Further rails 9 similar to the rails 8, are secured to the latter by means of hinges 10 and serve to connect the foot of the bed to the intermediate legs, said rails being also preferably in the form of angle irons, as shown in Fig. 6. Cross bars 11 and 12 respectively, are located between the legs of the foot and the legs of the head of the bed. The permanent rails of the bed carry a head section 13, comprising side bars 14, a top rail 15 and a mattress-supporting member 16, such as wire netting or the like. The side bars 14 are preferably of Z-shape in cross section, and are adapted to rest upon the rails 8, as shown most clearly in Fig. 5. The bars are further connected by means of hinges 17, to a substantially similar pair of bars 18 which are secured to the rails 8 in any suitable manner and which carry a continuation of the wire netting 16, the bars 18 being also of Z-shape in cross section, as shown in Fig. 6. A third pair of bars 19 which are similar to the bars 18 and 14 of the other sections, rest upon the rails 9 of the bedstead, and together with the mattress supporting netting which they carry, serve to constitute the foot portion of the device. These bars 19 are secured to the adjacent ends of the bars 18 by means of hinges $10^a$. This portion of the bedstead has an end bar 20 which carries a foot rest 21.

Secured to the side bars of the head portion 13 are two toothed segments 22 adapted to engage pinions 23, the latter being rigidly secured upon a shaft 24, mounted in journal brackets 25, secured to the under side of the rails 8. A substantially U-shaped member 27, has its ends formed into bearings 26 in which is journaled a shaft 29, having a worm 30, at one end thereof adapted to engage one of the pinions 23, and having the other end suitably fashioned to receive a crank 31. The member 27 is secured to the under side of one of the rails by means of rivets or bolts 28. The rotation of the shaft by means of the crank 31, operates the pinions and segments so that the head portion of the bed can be adjusted into any desired position.

Secured to the under side of the rails 9 are two internally toothed segments 32, which engage the pinions 33 carried on a shaft 34, which is supported in journal brackets 35 secured to the intermediate legs 7. Located on the under side of one of the rails 8 is a substantially U-shaped member 36, having its ends 37 suitably formed to constitute bearings for journaling a shaft 38. The latter has a worm 39 at one end thereof adapted to mesh with the pinion 33[a] rigid upon the shaft 34, and having its other end suitably formed to receive the crank 31. I further provide spring keepers 40 adapted to engage studs 41 on the legs 3 of the foot of the bed, so that they may be held in a folded position against the rails 9 when it is desired to change the bed into a chair, as shown most clearly in Fig. 3. Springs 6[a] mounted upon the cross bar 11 near the ends thereof control the legs 3 and tend normally to maintain them in operative positions at substantially right angles to the rails 9, as is shown most clearly in Fig. 1. The keepers 40 serve to hold the legs in folded or inoperative positions against the tension of the springs.

To bring the device into the form of a chair, the head section is raised by means of the crank 31, which serves to rotate the shaft 29 and the mechanism operable thereby. In a like manner, the end of the bed may be lowered to form the foot rest of the chair, the shaft 38 being operable in a like manner by the crank 31, after the legs 3 have been engaged by the keepers 40 so that they are held in position adjacent to the rails 9. When it is desired to again raise the movable section, the foot rest is first raised by means of the shaft 38 and the mechanism operable thereby, and then the movable section is brought into position after the legs have been released from their keepers.

If desired, any suitable braces 41[a] may be provided for holding the bars 18 to which the wire mattress is secured, in position against lateral strain.

It should be understood that if desired, my invention may be applied to any ordinary bedstead. In accomplishing this, the rails of the bedstead are cut and hinged together to form the foot. The legs of the foot are hinged so that they can be easily folded when the device is in the form of a reclining chair. Further, intermediate legs are provided to support the body of the bedstead and the other mechanism for operating the device as described. This feature is of economical value when it is desired to change ordinary bedsteads to conform with my device.

Having thus described my invention, I claim as new, and desire to secure by Letters Patent:—

1. A bedstead comprising a permanent section provided with legs, a movable section having a hinged connection with said permanent section and being provided with foldable legs, a movable back rest arranged upon said permanent section, a pivoted foot rest carried by said movable section, an internally notched segment secured to the under side of said foot rest, a shaft journaled between two of the legs of said permanent section, pinions carried by said shaft, one of said pinions being in mesh with said segment, and manually operable means for rotating the other of said pinions to adjust said foot rest.

2. A bedstead comprising a permanent section including side rails and legs at the end of said side rails for supporting the same, a movable section provided with rails having hinged connections with said rails of said permanent section and having foldable legs, means for holding said legs when folded adjacent to said rails of said movable section, a back rest movably carried on said permanent section, a foot rest mounted on said movable section, a flexible member covering said sections, notched segments secured to the under side of said permanent section, pinions carried by said shaft and adapted to mesh with said notched segments, a shaft having a worm at one end thereof and journaled on one of the rails of said permanent section, said worm being in mesh with one of said pinions, manually operable means for rotating said last-mentioned shaft, whereby said back rest may be moved into a plurality of positions, internally notched segments secured to the under side of said foot rest, a shaft journaled to two of the legs of said permanent section, pinions carried by said shaft and adapted to mesh with said segments, a further pinion rigid with said last mentioned shaft, and a further shaft journaled to the under side of one of the rails of said permanent section and having a worm on one end adapted to engage said last-mentioned pinion, whereby said movable section may be moved into a plurality of positions.

3. A bedstead comprising a permanent section, a movable section having a hinged connection therewith, and a mattress frame supported partly by each of said sections, said frame being rigidly secured to said permanent section and being supported upon said movable section.

4. A bedstead comprising a permanent section, a movable foot section having a hinged connection therewith and adapted to be arranged in a plurality of positions, and a mattress frame secured upon said permanent section and having a part extending over said movable foot section and movably resting thereon.

5. A bedstead comprising a permanent section, a movable foot section hinged thereto, a mattress frame rigidly secured to said permanent section and movably carried by said movable foot section, said mattress frame including a movable head section adapted to rest upon said permanent section.

6. A bedstead comprising a permanent section, a movable foot section, a mattress frame supported partly by said permanent section and partly by said foot section and rigidly secured to said permanent section, said mattress frame being movably carried by said foot section and having at the end, upon said foot section, a foot rest.

In testimony whereof I have signed my name to this specification in the presence of two subscribing witnesses.

HOMER A. SEARS.

Witnesses:

JOHN K. BRACHVOGEL,

PHILIP D. ROLLHAUS.